(12) United States Patent
Oshiro et al.

(10) Patent No.: US 10,432,392 B1
(45) Date of Patent: Oct. 1, 2019

(54) FRAME SYNCHRONIZATION METHOD, PROCESSOR, AND COMMUNICATION APPARATUS

(71) Applicants: KABUSHIKI KAISHA TOSHIBA, Minato-ku, Tokyo (JP); TOSHIBA ELECTRONIC DEVICES & STORAGE CORPORATION, Minato-ku, Tokyo (JP)

(72) Inventors: Masayoshi Oshiro, Ota Tokyo (JP); Takashi Seki, Yokohama Kanagawa (JP)

(73) Assignees: KABUSHIKI KAISHA TOSHIBA, Tokyo (JP); TOSHIBA ELECTRONIC DEVICES & STORAGE CORPORATION, Tokyo (JP)

( * ) Notice: Subject to any disclaimer, the term of this patent is extended or adjusted under 35 U.S.C. 154(b) by 0 days.

(21) Appl. No.: 16/122,464

(22) Filed: Sep. 5, 2018

(30) Foreign Application Priority Data

Mar. 20, 2018 (JP) ................................ 2018-052483

(51) Int. Cl.
*H04L 7/04* (2006.01)
*H04L 7/06* (2006.01)
*H04L 7/00* (2006.01)
*H04B 17/336* (2015.01)

(52) U.S. Cl.
CPC .......... *H04L 7/042* (2013.01); *H04B 17/336* (2015.01); *H04L 7/0087* (2013.01); *H04L 7/048* (2013.01)

(58) Field of Classification Search
CPC ....... H04L 7/042; H04L 7/0087; H04L 7/048; H04L 27/2656; H04B 17/336; H04B 1/7073; H04J 3/0605
USPC ................ 375/362, 364, 365, 366, 367, 368
See application file for complete search history.

(56) References Cited

U.S. PATENT DOCUMENTS

| 6,526,107 | B1 * | 2/2003 | Katoh .................. | H04J 3/0605 370/203 |
|---|---|---|---|---|
| 7,778,363 | B2 | 8/2010 | Inagawa et al. | |
| 2007/0217524 | A1 * | 9/2007 | Wang ................. | H04L 27/2656 375/260 |
| 2010/0303179 | A1 | 12/2010 | Inagawa et al. | |

(Continued)

FOREIGN PATENT DOCUMENTS

| JP | 4837403 B2 | 12/2011 |
|---|---|---|
| JP | 4842159 B2 | 12/2011 |
| JP | 4850735 B2 | 1/2012 |

*Primary Examiner* — Phuong Phu
(74) *Attorney, Agent, or Firm* — Holtz, Holtz & Volek PC

(57) ABSTRACT

A frame synchronization method of an embodiment is disclosed. The method includes comparing a preamble arranged at a predetermined position in a received signal with a predetermined signal pattern to calculate a maximum preamble correlation value, using the maximum preamble correlation value to estimate a C/N ratio of the received signal, setting a correlation threshold for frame synchronization detection according to the estimated C/N ratio, and comparing an access address arranged at a predetermined position in the received signal with a predetermined signal pattern to calculate a preamble correlation value, and detecting timing at which the preamble correlation value first exceeds the set correlation threshold as a frame synchronization point.

10 Claims, 6 Drawing Sheets

(56) References Cited

U.S. PATENT DOCUMENTS

2011/0007858 A1\* 1/2011 Guerrieri ............... H04L 7/042
375/368
2014/0254562 A1\* 9/2014 Shim ................... H04B 1/7073
370/335

\* cited by examiner

FRAME SYNCHRONIZATION METHOD, PROCESSOR, AND COMMUNICATION APPARATUS

CROSS-REFERENCE TO RELATED APPLICATION

This application is based upon and claims the benefit of priority from the prior Japanese Patent Application No. 2018-52483 filed on Mar. 20, 2018; the entire contents of which are incorporated herein by reference.

FIELD

An embodiment herein relates generally to a frame synchronization method, a processor, and a communication apparatus.

BACKGROUND

When framed data is exchanged between a transmission apparatus and a receiving apparatus, it is necessary to establish frame synchronization of a received signal in the receiving apparatus. In a correlation method widely used to establish synchronization in general, when an information signal is sent from the transmission apparatus to the receiving apparatus, a reference signal is added to a head of the information signal. The reference signal is a signal sequence having a predetermined signal pattern. The receiving apparatus calculates a cross correlation value between the received signal and the signal pattern of the reference signal which is known. By detecting timing of a peak of the calculated cross correlation value, start timing of the information signal is specified.

For example, in Bluetooth (registered trademark) Low Energy (hereinafter called BLE), both a reference signal of a preamble and a reference signal of an access address are added to a head of a communication signal that is transmitted. The preamble is a signal pattern in which "0" and "1" are repeated alternately, and is used to detect timing in bit (symbol) units. The access address (synchronization word) is a random value assigned for each connection between the transmission apparatus and the receiving apparatus, and is used to detect timing in frame units.

Usually, when a bit length of the access address is long, in order to suppress delay of processes, instead of detecting a maximum value of the cross correlation value of all bits, a point at which the cross correlation value between the access address and the known reference signal exceeds a detection threshold has been regarded as a frame synchronization point.

However, for example, in a case of a frame format which is periodic and has strong similar pattern nature such as LE Coded PHY in BLE5.0, there exist a plurality of points (called side lobes) with a large correlation value other than the original frame synchronization point (called a main lobe) due to the pattern nature. Therefore, even if a frame detection threshold is set to be low in order to respond to a signal which is in such a state with a small carrier noise ratio (hereinafter called a C/N ratio) and much noise, there is a problem that a frame synchronization point is erroneously detected. Because under a communication signal which is in a state with a large C/N ratio and low noise, an access address cross correlation value in a certain side lobe may exceed the detection threshold before the synchronization point which is a true synchronization point (or a correct point).

DETAILED DESCRIPTION

A frame synchronization method of an embodiment includes comparing a first reference signal arranged at a predetermined position in a received signal with a first known signal pattern to calculate a maximum value of a first cross correlation value, using the maximum value of the first cross correlation value to estimate a C/N ratio of the received signal, and setting a correlation threshold for frame synchronization detection according to the estimated C/N ratio. The frame synchronization method further includes comparing a second reference signal for frame synchronization arranged at a predetermined position in the received signal with a second known signal pattern, calculating a second cross correlation value according to the comparison of the second reference signal with the second known signal pattern, and detecting timing at which the second cross correlation value first exceeds the set a correlation threshold as a frame synchronization point.

An embodiment will be described below with reference to the drawings.

Figure 1:
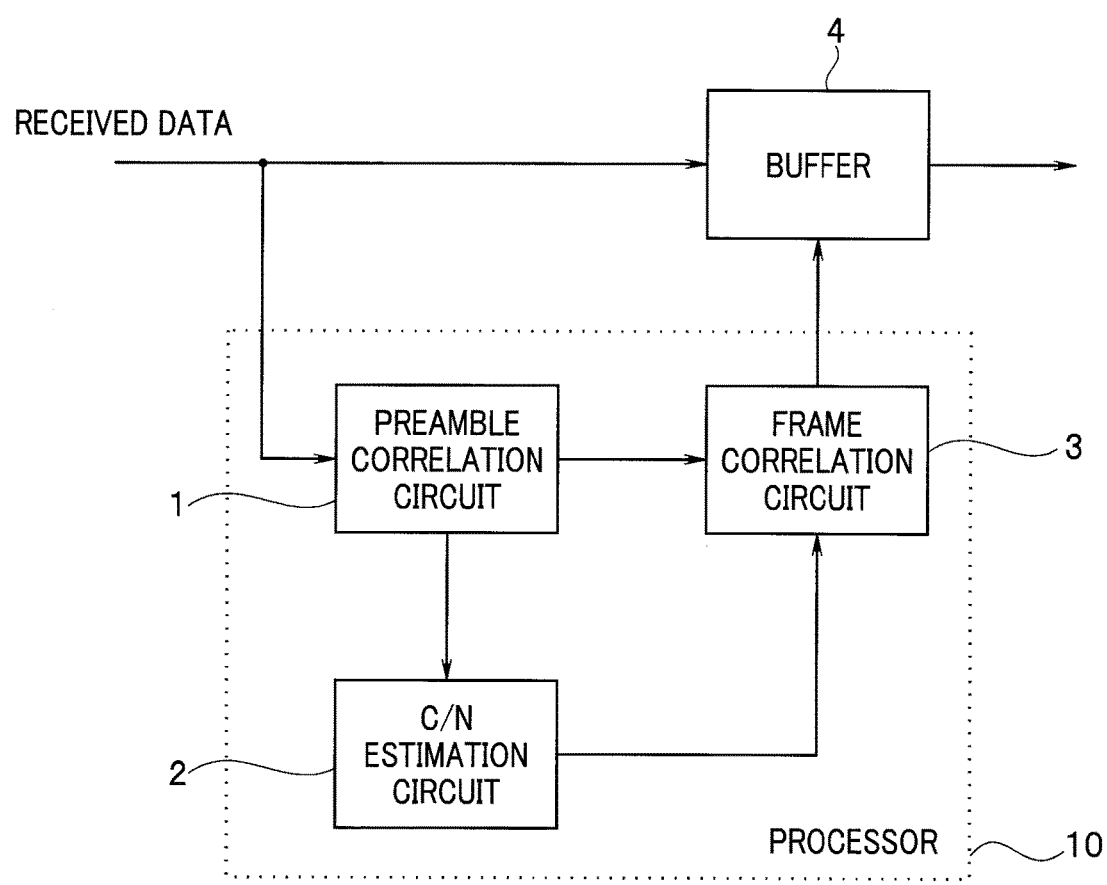
FIG. 1 is a schematic block diagram showing an example of a configuration of a receiving apparatus which is used for a frame synchronization method according to an embodiment.

FIG. 1 is a schematic block diagram showing an example of a configuration of a receiving apparatus which is used for a frame synchronization method according to the present embodiment. The receiving apparatus has a preamble correlation circuit 1, a C/N estimation circuit 2, a frame correlation circuit 3, and a buffer 4. The preamble correlation circuit 1, the C/N estimation circuit 2, and the frame correlation circuit 3 are included in a processor 10 and respective processing of those circuits 1, 2, and 3 are executed as a part of functions of the processor 10.

The preamble correlation circuit 1 calculates a cross correlation value (preamble cross correlation value) between a preamble (first reference signal) of a head of a received signal (received data) and a comparison signal which is a known preamble. A maximum value of the preamble cross correlation value being a first cross correlation value is calculated, and is outputted to the C/N estimation circuit 2. The received signal used to calculate the preamble cross correlation value is outputted to the frame correlation circuit 3 as it is.

For example, the preamble correlation circuit 1 multiplies the received signal $A(nT)$ and the comparison signal $B(nT)$ for each bit, and adds the results. More specifically, respective bits of the comparison signal $B(nT)$ composed of a bit string of $Bn, Bn-1, Bn-2, \ldots B1$ are multiplied by $A(nT)$, $A((n-1)T), A((n-2)T), \ldots, A(T)$ being respective bits of the received signal A(nT). By adding the multiplication values, the preamble cross correlation value is obtained.

The maximum value of the preamble cross correlation value calculated during a predetermined time period set in advance is inputted to the C/N estimation circuit 2. A relationship between a C/N ratio of a received signal and a maximum value of a preamble cross correlation value is registered in advance in the C/N estimation circuit 2.

Figure 2:
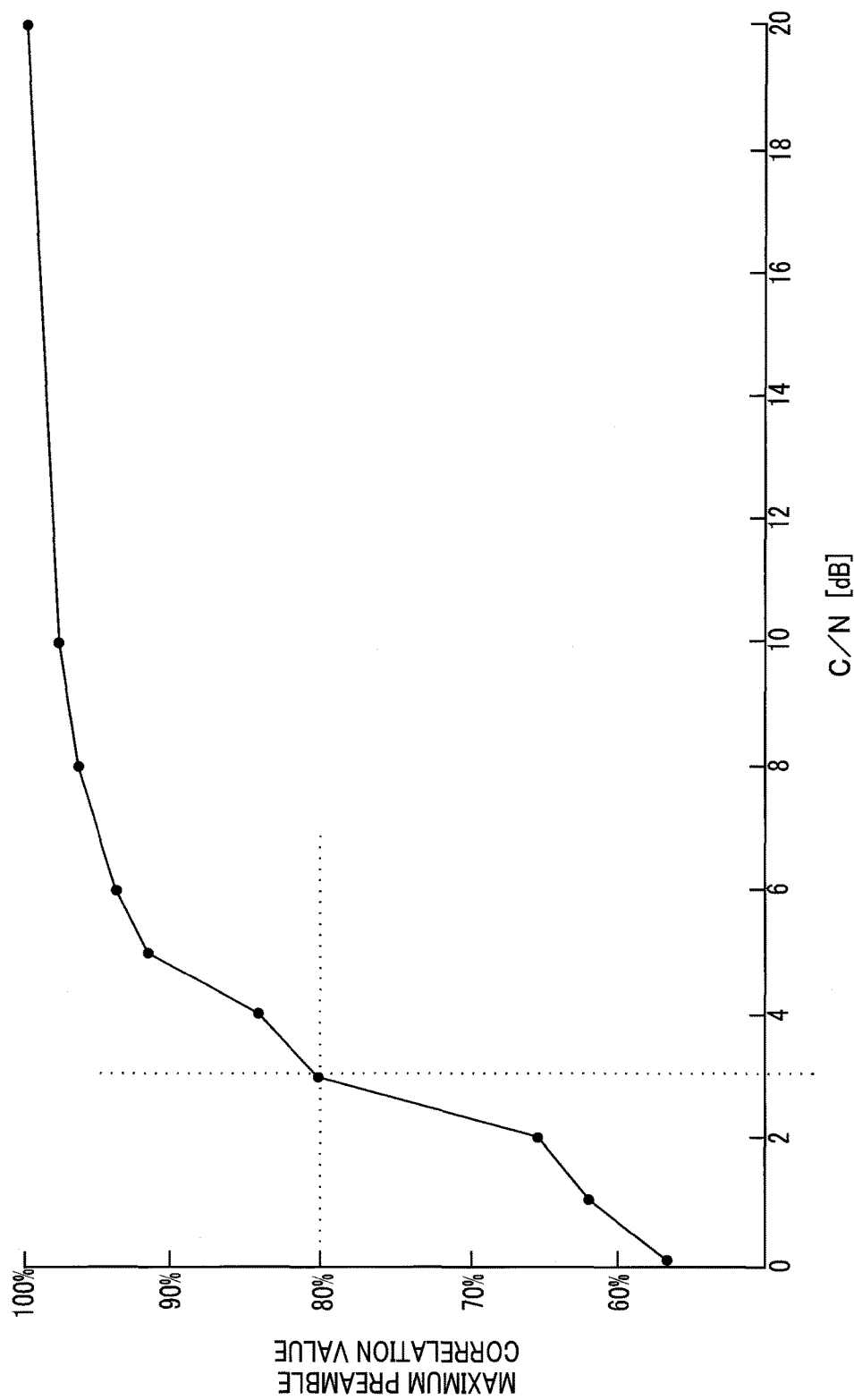
FIG. 2 is a diagram for explaining an example of a relationship between a maximum preamble correlation value and a C/N ratio.

FIG. 2 is a diagram for explaining an example of a relationship between a maximum preamble correlation value and a C/N ratio. As shown in FIG. 2, as the C/N ratio is higher, that is, as a noise component is less, the maximum preamble correlation value increases. The maximum preamble correlation value decreases in an area where the C/N ratio is low. A correspondence relationship between the C/N ratio and the maximum preamble correlation value obtained by previous measurement or the like is stored in advance in an unshown memory or the like of the C/N estimation circuit 2.

The C/N estimation circuit 2 collates the inputted maximum value of the preamble cross correlation value with the registered relationship between the C/N ratio of the received signal and the maximum value of the preamble cross correlation value to estimate the C/N ratio of the received signal. For example, when the maximum preamble correlation value and the C/N ratio are in the correspondence relationship shown in FIG. 2, the C/N ratio is estimated as 3 dB if the maximum value of the preamble cross correlation value inputted from the preamble correlation circuit 1 is 80%. The C/N ratio estimated based on the maximum value of the preamble cross correlation value is inputted to the frame correlation circuit 3.

The frame correlation circuit 3 calculates a correlation value (access address correlation value) between an access address (second reference signal) added subsequently to the preamble in the received signal and a comparison signal being a known access address. Timing at which the access address correlation value being a second cross correlation value becomes equal to or greater than a predetermined correlation threshold (frame correlation threshold) is determined as a frame synchronization point, and is outputted to the buffer 4 being a synchronization circuit.

Figure 3:
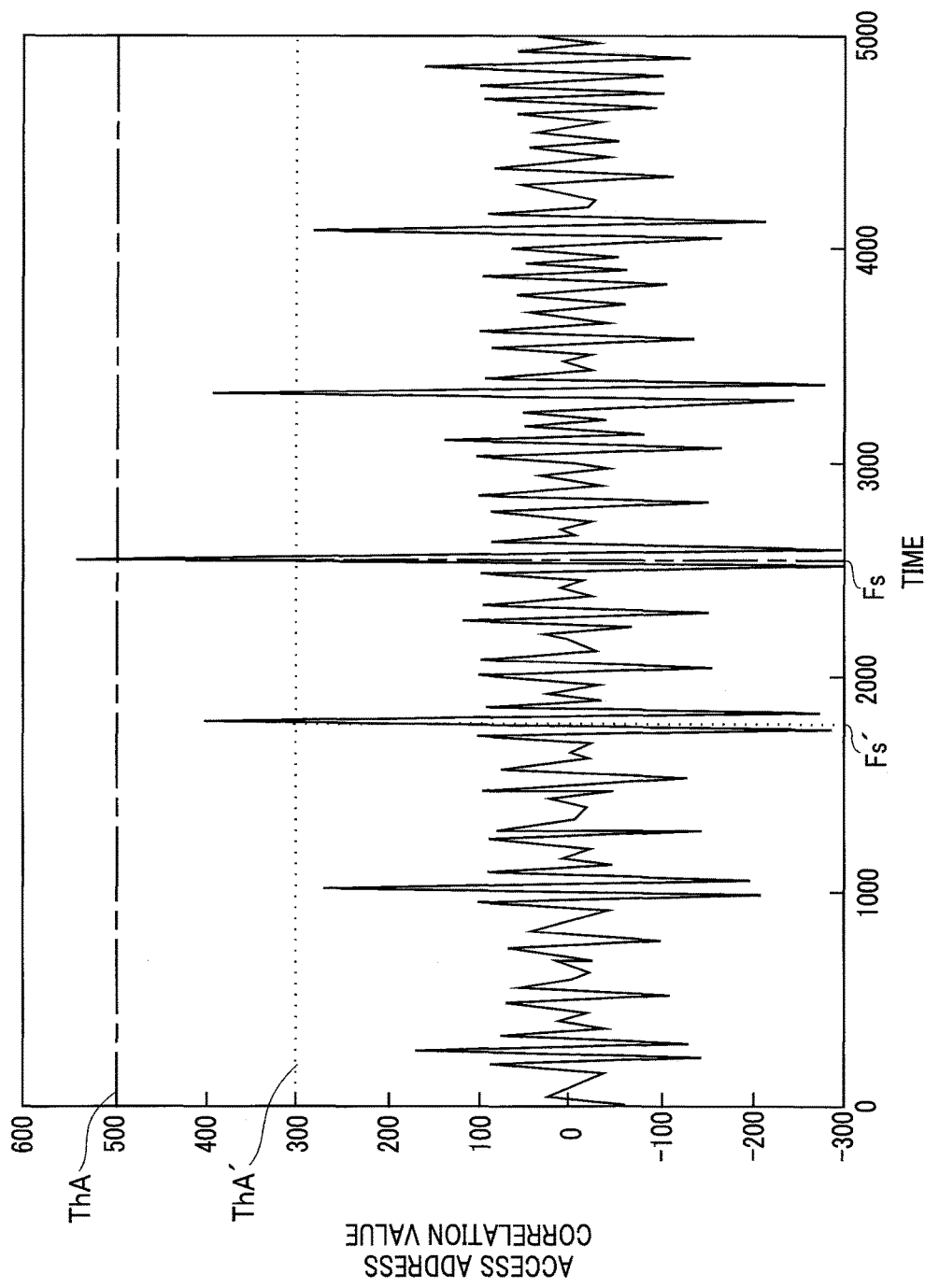
FIG. 3 is a diagram for explaining a method for detecting a frame synchronization point using an access address correlation value.

FIG. 3 is a diagram for explaining a method for detecting a frame synchronization point using an access address correlation value. When the access address is composed of repetitions of a similar pattern, a time waveform of the access address correlation value is as shown in FIG. 3. That is, the time waveform has the frame synchronization point (a main lobe) and side lobes of which a plurality of peaks appear on both sides of the frame synchronization point.

A level of the access address correlation value depends on the C/N ratio of the received signal. That is, as the C/N ratio of the received signal becomes larger and quality of the received signal becomes higher, the access address correlation value has a larger value. On the other hand, as the C/N ratio becomes smaller and quality of the received signal becomes lower, the access address correlation value has a smaller value. As described, usually in order to surely detect the frame synchronization point, the frame correlation threshold is set according to the access address correlation value by assuming the C/N ratio being small, without considering the C/N ratio of the received signal. For example, the frame correlation threshold is set to a value which is smaller than a value of the main lobe and which is larger than a value of the side lobe when the C/N ratio is 0 dB.

Here, if the C/N ratio of the received signal is large, the access address correlation value of the side lobe is also a large value. In this case, the frame correlation circuit 3 erroneously detects the frame synchronization point when the value of the side lobe is larger than the frame correlation threshold because first timing at which the access address correlation value exceeds the frame correlation threshold is determined as a synchronization point.

According to the present embodiment, the frame correlation threshold used in the frame correlation circuit 3 is adjusted according to the C/N ratio of the received signal estimated in the C/N estimation circuit 2. For example, two kinds of thresholds are set in advance which are a low frame correlation threshold used for a received signal with a C/N ratio smaller than 3 dB and a high frame correlation threshold used for a received signal with a C/N ratio equal to or greater than 3 dB, and which of the thresholds to use is selected according to the C/N ratio inputted from the C/N estimation circuit 2.

In FIG. 3, the low frame correlation threshold ThA' is set to 300, and the high frame correlation threshold ThA is set to 500, for example. In a case where the C/N ratio of the received signal is 20 dB for example, and a signal with high quality is inputted, when the low frame correlation threshold ThA' is used to determine the frame synchronization point, an access address correlation value at a time Fs' is erroneously detected as the frame synchronization point, since a side lobe one before a main lobe which is a true synchronization point also has an access address correlation value over 300.

However, according to the embodiment, the frame correlation threshold is changed to the high frame correlation threshold ThA and perform a frame synchronization determination is performed, based on the C/N ratio (=20 dB) of the received signal which is estimated by the C/N estimation circuit 2. Accordingly, only the main lobe exceeds the frame correlation threshold and an access address correlation value at a time Fs is detected as the frame synchronization point. Thus, the side lobe is no longer erroneously detected as the frame synchronization point. As a result, detection accuracy of the frame synchronization point is improved according to the embodiment.

The frame correlation circuit 3 outputs the detected frame synchronization point to the buffer 4. The buffer 4 performs a frame synchronization process of the received signal using the inputted synchronization point to output a synchronized signal.

Next, the frame synchronization method in the present embodiment will be described. A frame format of the received signal is, for example, a format of LE Coded PHY S=8 in BLE5.0 shown in FIG. 4.

Figure 4:
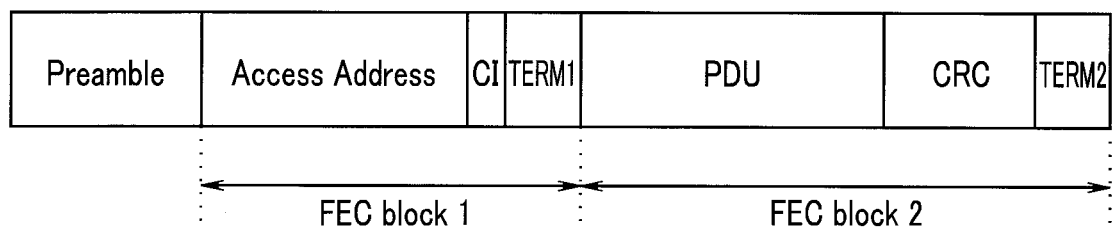
FIG. 4 is a diagram showing an example of a structure of a frame of a received signal.

FIG. 4 is a diagram showing an example of a structure of a frame of a received signal. More specifically, FIG. 4 shows the frame format of LE Coded PHY S=8 in BLE5.0. As shown in FIG. 4, in a frame of LE Coded PHY S=8, a preamble and a FEC block 1 including an access address are added in front of a FEC block 2 being data.

The preamble is used for gain adjustment, synchronization in symbol units, or the like. The preamble is composed of a data sequence of 80 bits obtained by repeating ten times a pattern of 8 bits of "00111100" which is generated by fourfold diffusing patterns of "0" and "1" to "0011" and "1100".

The access address is a random value assigned for each connection between two devices. The access address is an identifier for distinguishing to which connection the frame belongs, and is used for synchronization in frame units. The access address is composed of a data sequence of 256 bits generated by performing convolutional encoding of data of 32 bits indicating the identifier, and fourfold diffusing "0" to "0011" and "1" to "1100" similarly to the preamble. That is, patterns of "0011" and "1100" frequently appears in the access address.

Figure 5:
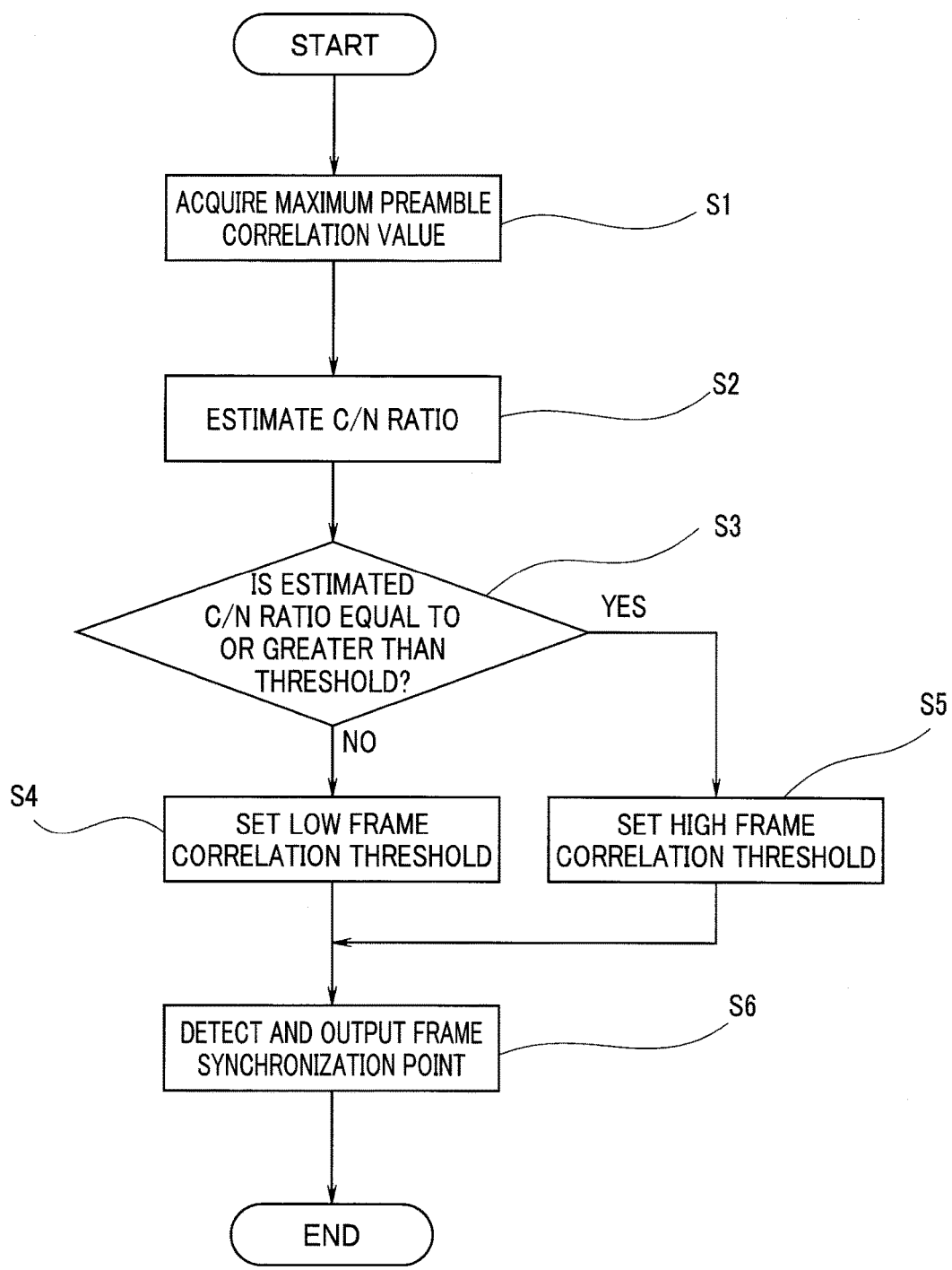
FIG. 5 is a flowchart for explaining an example of the frame synchronization method according to the embodiment.

A method for receiving a communication signal having such a frame format and performing frame synchronization will be described using FIG. 5. FIG. 5 is a flowchart for explaining an example of the frame synchronization method according to the present embodiment.

First, the maximum preamble correlation value is acquired in the preamble correlation circuit 1 (S1). When a bit length of the preamble is known like LE Coded PHY S=8 in BLE5.0, a correlation length of the received signal is set to the bit length of the preamble.

Next, the C/N ratio of the received signal is estimated in the C/N estimation circuit 2 (S2). More specifically, the maximum value of the preamble cross correlation value acquired in the preamble correlation circuit 1 is collated with a registered relationship between the C/N ratio of the received signal and the maximum value of the preamble cross correlation value to estimate the C/N ratio of the received signal.

Subsequently, the estimated C/N ratio is compared with a preset C/N threshold (S3). When the estimated C/N ratio is smaller than the C/N threshold (S3, NO), a low frame correlation threshold is set in the frame correlation threshold used in the frame correlation circuit 3 (S4). When the estimated C/N ratio is equal to or greater than the C/N threshold (S3, YES), a high frame correlation threshold is set in the frame correlation threshold used in the frame correlation circuit 3 (S5).

Finally, the frame correlation circuit 3 calculates the access address correlation value between the access address signal added to the received signal and the comparison signal being the known access address signal. Timing of first becoming equal to or greater than the frame correlation threshold in the access address correlation value is extracted as the frame synchronization point, and is outputted to the buffer 4 (S6).

When specific signal patterns ("0011" and "1100") and patterns similar to the patterns frequently appear in the access address like the frame format of LE Coded PHY S=8 in BLE5.0 shown in FIG. 4, the access address correlation value of the side lobe takes a value close to the access address correlation value of the main lobe being the true frame synchronization point. Therefore, when the C/N ratio gets higher and the access address correlation value of the main lobe gets higher, the access address correlation value of the side lobe also has a higher value.

When the frame synchronization point is detected using a threshold capable of detecting the access address correlation value of the main lobe in a case of a low C/N ratio for the received signal in such a frame format, the threshold has a lower value than the access address correlation value of the side lobe when the C/N ratio of the received signal is high, so that there is a very high possibility that the side lobe is erroneously detected as the frame synchronization point. In contrast, according to the embodiment, since the frame correlation threshold is changed based on the C/N ratio, it is possible to prevent the side lobe from being erroneously detected as the frame synchronization point even for a received signal with a high C/N ratio.

Thus, according to the embodiment, for a received signal which can be subjected to two-stage synchronization which is symbol synchronization using a reference signal such as a preamble and frame synchronization using a reference signal such as an access address, at first, the C/N ratio of the received signal is estimated based on the maximum preamble correlation value. The frame correlation threshold is set according to the estimated C/N ratio, and timing at which the access address correlation value exceeds the frame correlation threshold is detected as the frame synchronization point.

That is, by adjusting the frame correlation threshold according to the C/N ratio of the received signal, it is possible to prevent a peak other than the true synchronization point from being erroneously detected as the frame synchronization point even for a communication signal in a state with a large C/N ratio and low noise to improve detection accuracy of the frame synchronization point.

Although two kinds of thresholds which are the low frame correlation threshold used for a received signal with a C/N ratio smaller than 3 dB and the high frame correlation threshold used for a received signal with a C/N ratio equal to or greater than 3 dB are set in advance in the above description, three or more kinds of frame correlation thresholds may be set. It is also possible to register in advance as a function of a C/N ratio, and when an estimated C/N ratio is inputted, to calculate a corresponding frame correlation threshold.

The C/N ratio at which the low frame correlation threshold and the high frame correlation threshold are switched is not limited to 3 dB, and may be a value equal to or greater than 3 dB or a value equal to or smaller than 3 dB as long as being a predefined value.

Furthermore, instead of determining the frame correlation threshold using the estimated C/N ratio, it is also possible to determine the frame correlation threshold using the maximum preamble correlation value. For example, it is also possible to use the high frame correlation threshold for the received signal when the maximum preamble correlation value is equal to or greater than 80%, and use the low frame correlation threshold when the maximum preamble correlation value is smaller than 80%. Note that the maximum preamble correlation value at which the low frame correlation threshold and the high frame correlation threshold are switched is not limited to 80%, and may be a value equal to or greater than 80% or a value equal to or smaller than 80% as long as being a predefined value.

Also when the frame correlation threshold is changed according to the maximum preamble correlation value, similarly to the case of using the C/N ratio, three or more kinds of frame correlation thresholds may be set, and when the maximum preamble correlation value is inputted, a corresponding frame correlation threshold may be calculated.

The frame format of the received signal is not limited to LE Coded PHY S=8 in BLE5.0, and may be a signal in any frame format as long as being a received signal to which a reference signal for symbol synchronization and a reference signal for frame synchronization are added.

In the above description, the preamble cross correlation value is calculated each time the received signal is read by one bit. The preamble cross correlation value becomes a maximum value at a time point when the data sequence composing the preamble has been completely read. Accordingly, when a preamble of 80 bits is used and a signal of one bit is read per clock, 80 clocks are required from start of reading of the received signal until acquisition of the maximum preamble correlation value. That is, in the above method, when the data length of the preamble is long, a time period for calculating the maximum preamble correlation value is also long, so that processing speed of the received signal decreases.

Thus, at a time point when the preamble is read by a predetermined number of bits (or a predetermined time period), previous transition of the preamble cross correlation value is referenced to estimate the maximum preamble correlation value. The estimated maximum preamble correlation value may be used to estimate the C/N ratio. By estimating the maximum preamble correlation value, a symbol synchronization processing time period is shortened, so it is possible to make quick transition to frame synchronization.

The frame synchronization method according to the present embodiment is applicable to frame synchronization of a radio signal received by a communication apparatus 100 configured to perform radio signal communication, for example. Hereinafter, description will be made on the communication apparatus 100 using the frame synchronization method according to the present embodiment.

Figure 6:
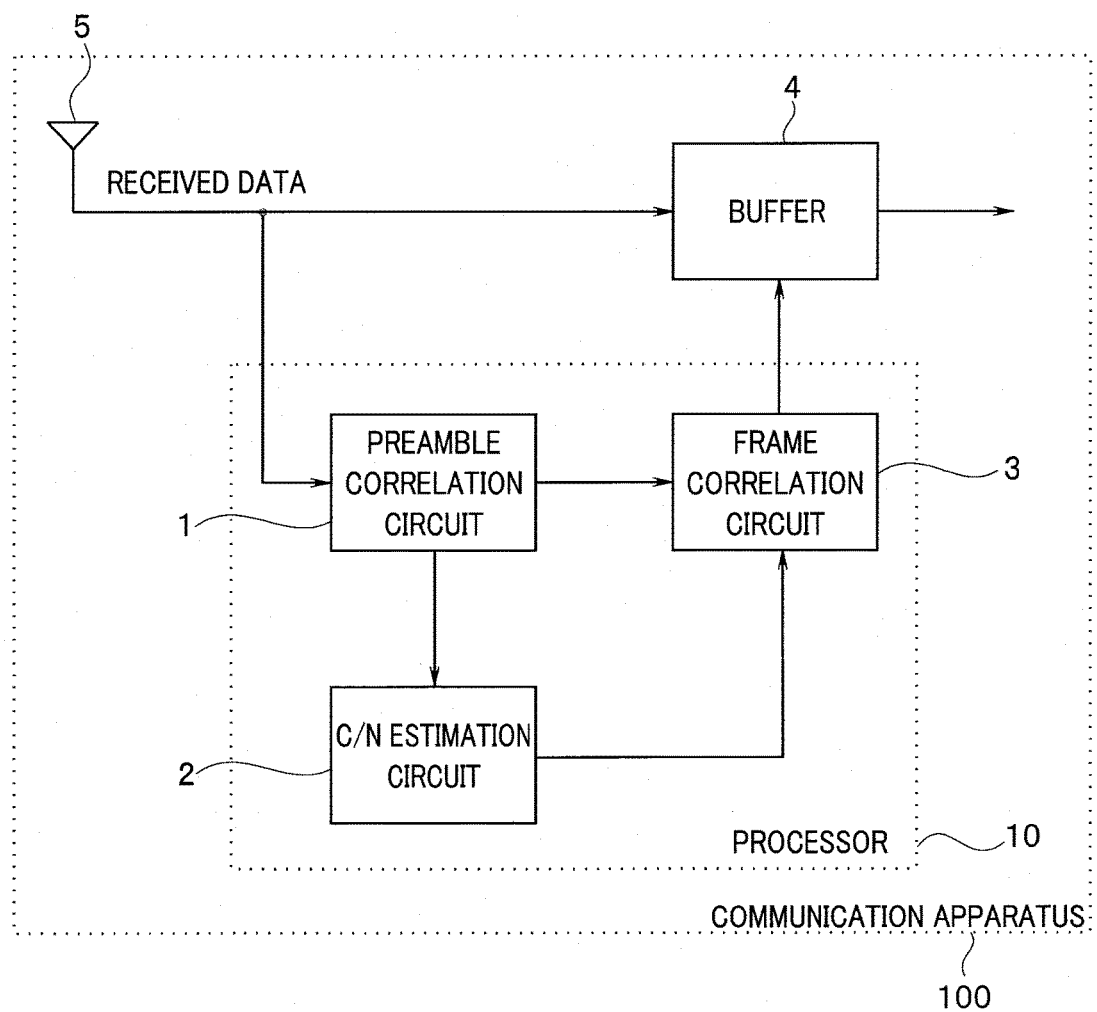
FIG. 6 is a schematic block diagram showing an example of a communication apparatus according to the embodiment.

FIG. 6 is a schematic block diagram showing an example of the communication apparatus 100 according to the present embodiment. The communication apparatus 100 includes an antenna 5 that is capable of receiving a radio signal, in addition to the respective constituent elements in the receiving apparatus shown in FIG. 1. The communication apparatus 100 converts an analog radio signal received from the antenna 5 into a digital received signal by an A/D conversion section, etc., not shown. The received signal is inputted to the processor 10, and a frame synchronization point is detected. The received signal is also inputted to the buffer 4. The buffer 4 performs synchronization process of the received signal using the frame synchronization point detected by the processor 10.

When the frame synchronization process is performed on the received radio signal in the communication apparatus 100 configured as described above, the detection accuracy of the frame synchronization point can be improved by using the above-described frame synchronization method.

While certain embodiments have been described, these embodiments have been presented by way of example only, and are not intended to limit the scope of the inventions. Indeed, the novel devices and systems described herein may be embodied in a variety of other forms; furthermore, various omissions, substitutions and changes in the form of the devices and systems described herein may be made without departing from the spirit of the inventions. The accompanying claims and their equivalents are intended to cover such forms or modifications as would fall within the scope and spirit of the inventions.

What is claimed is:

1. A frame synchronization method comprising:
    comparing a first reference signal arranged at a predetermined position in a received signal with a first known signal pattern;
    calculating a maximum value of a first cross correlation value;
    estimating a C/N ratio of the received signal, using the maximum value of the A first cross correlation value;
    setting a correlation threshold for detecting a frame synchronization according to the estimated C/N ratio;
    comparing a second reference signal for a frame synchronization with a second known signal pattern, the second reference signal being arranged at a predetermined position in the received signal;
    calculating a second cross correlation value according to the comparison of the second reference signal with the second known signal pattern; and
    detecting timing at which the second cross correlation value first exceeds the correlation threshold as a frame synchronization point.

2. The frame synchronization method according to claim 1, wherein
    a correlation threshold candidate corresponding to the estimated C/N ratio is selected from among a plurality of correlation threshold candidates of two or more kinds with different values set in advance, and the correlation threshold candidate is set as the correlation value for frame synchronization detection.

3. The frame synchronization method according to claim 1, wherein
    a part of bits of the first reference signal is used to estimate the maximum value of the first cross correlation value.

4. The frame synchronization method according to claim 3, wherein
    a temporal change in the first cross correlation value is calculated, and a regression line of a local maximum value of the first cross correlation value is used to estimate the maximum value of the first cross correlation value.

5. The frame synchronization method according to claim 1, wherein
    the maximum value of the first cross correlation value acquired by a predetermined time is used to estimate the C/N ratio of the received signal.

6. The frame synchronization method according to claim 1, wherein
    the first reference signal is a preamble added to a head of the received signal.

7. The frame synchronization method according to claim 1, wherein
    a frame format of the received signal is Bluetooth Low Energy.

8. The frame synchronization method according to claim 7, wherein
    the second reference signal is an access address.

9. A processor including:
    a preamble correlation circuit that compares a first reference signal arranged at a predetermined position in a received signal with a first known signal pattern to calculate a maximum value of a first cross correlation value;
    a C/N estimation circuit that uses the maximum value of the first cross correlation value to estimate a C/N ratio of the received signal; and
    a frame correlation circuit that sets a correlation threshold for frame synchronization detection according to the estimated C/N ratio, and to compare a second reference signal for frame synchronization arranged at a predetermined position in the received signal with a second known signal pattern to calculate a second cross correlation value, and detect timing at which the second cross correlation value first exceeds the set a correlation threshold as a frame synchronization point.

10. A communication apparatus comprising:
    an antenna that receives a radio signal;
    the processor according to claim 9, the processor detecting a frame synchronization point of a received signal obtained by performing analog-digital conversion on the radio signal; and a buffer that performs frame synchronization process of the received signal using the frame synchronization point, and outputs a synchronized signal.

\* \* \* \* \*